United States Patent
Sugaya

(10) Patent No.: US 11,188,053 B2
(45) Date of Patent: Nov. 30, 2021

(54) COMPUTER SYSTEM, OPERATION VERIFICATION METHOD, AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 17/271,758

(22) PCT Filed: Aug. 28, 2018

(86) PCT No.: PCT/JP2018/031784
§ 371 (c)(1),
(2) Date: Feb. 26, 2021

(87) PCT Pub. No.: WO2020/044440
PCT Pub. Date: Mar. 5, 2020

(65) Prior Publication Data
US 2021/0311455 A1    Oct. 7, 2021

(51) Int. Cl.
*G05B 19/4068* (2006.01)
*G05B 19/4063* (2006.01)
*G06T 7/00* (2017.01)

(52) U.S. Cl.
CPC ..... *G05B 19/4068* (2013.01); *G05B 19/4063* (2013.01); *G06T 7/0004* (2013.01);
(Continued)

(58) Field of Classification Search
None
See application file for complete search history.

(56) References Cited

U.S. PATENT DOCUMENTS

| | | | |
|---|---|---|---|
| 2002/0133264 A1* | 9/2002 | Maiteh | G05B 19/4097 700/182 |
| 2009/0015668 A1* | 1/2009 | Tian | G06T 7/593 348/92 |

(Continued)

FOREIGN PATENT DOCUMENTS

| | | |
|---|---|---|
| JP | 2005-346283 A | 12/2005 |
| JP | 2010-140359 A | 6/2010 |

(Continued)

OTHER PUBLICATIONS

International Search Report issued in PCT/JP2018/031784 dated Oct. 16, 2018.

(Continued)

*Primary Examiner* — Ryan A Jarrett
(74) *Attorney, Agent, or Firm* — Norton Rose Fulbright US LLP; James R. Crawford

(57) ABSTRACT

Provided are a computer system, and a method and a program for operation verification that easily know the operation of a machine tool more exactly. The computer system acquires operating data while a machine tool operates for a predetermined time, generates computer graphics virtually showing that the machine tool operates for the predetermined time from the acquired data, acquires an image of the machine tool that has taken for the predetermined time, and compares the image with the computer graphics for the predetermined time. The computer system also notifies the abnormality if an abnormality has been detected as the result of the comparison.

6 Claims, 5 Drawing Sheets

(52) U.S. Cl.
CPC ............... *G05B 2219/33301* (2013.01); *G06T 2207/30164* (2013.01)

(56) References Cited

U.S. PATENT DOCUMENTS

| | | | |
|---|---|---|---|
| 2010/0063617 A1* | 3/2010 | Mori | G05B 19/402 |
| | | | 700/175 |
| 2015/0220077 A1* | 8/2015 | Reiser | G05B 19/401 |
| | | | 700/114 |
| 2018/0165884 A1* | 6/2018 | Wagner | E02F 9/26 |
| 2020/0230771 A1* | 7/2020 | Kasahara | G06T 7/0004 |
| 2021/0089016 A1* | 3/2021 | Buggenthin | G05B 23/024 |

FOREIGN PATENT DOCUMENTS

| | | |
|---|---|---|
| JP | 2012-113438 A | 6/2012 |
| JP | 2017-191351 A | 10/2017 |
| WO | 2017/042873 A1 | 3/2017 |
| WO | WO-2020012569 A1 * | 1/2020 ............. B23Q 17/20 |

OTHER PUBLICATIONS

Yoshinori Inoue et al., "3D-CG Oriented Robot Vision—Object Extraction and Motion Tracking by Comparing Virtual and Real Images", IEICE Technical Report, Dec. 21, 1995, vol. 95, No. 445, pp. 17-24.

\* cited by examiner

COMPUTER SYSTEM, OPERATION VERIFICATION METHOD, AND PROGRAM

CROSS-REFERENCE TO RELATED APPLICATIONS

This patent application is a national phase under 35 U.S.C. § 371 of International Patent Application No. PCT/JP2018/031784 filed Aug. 28, 2018, which is hereby incorporated herein by reference in its entirety for all purposes.

TECHNICAL FIELD

The present disclosure relates to a computer system, and a method and a program for operation verification.

BACKGROUND

Recently, the technology of digital twin that reproduces a product manufacturing process in computer graphics has been known in industrial fields. Such a technology acquires the orientation and the operation of a machine tool from sensor information reproduces the orientation and the operation of the machine tool in computer graphics based on this acquired sensor information.

The technology that acquires the three-dimensional data of the work space where a worker works as a technology similar to digital twin, compares this three-dimensional data with work procedures based on a work manual, and judges if the conditions for the end of the working process have been satisfied (refer to Patent Document 1).

DOCUMENT IN THE EXISTING ART

Patent Document

Patent Document 1: JP 2017-191351A

SUMMARY

However, the composition of Patent Document 1 acquires data necessary for three-dimensional data from a sensor but may not reflect three-dimensional data in the operation because accurate three-dimensional data cannot be generated if this sensor is failed An objective of the present disclosure is to provide a computer system, and a method and a program for operation verification that easily know the operation of a machine tool more exactly.

The present disclosure provides a computer system including:
 a data acquisition unit that acquires operating data while a machine tool operates for a predetermined time;
 a CG generation unit that generates computer graphics virtually showing that the machine tool operates for the predetermined time from the acquired data;
 a camera image acquisition unit that acquires an image of the machine tool that has taken for the predetermined time; and
 a comparison unit that compares the image with the computer graphics for the predetermined time.

According to the present disclosure, the computer system acquires operating data while a machine tool operates for a predetermined time, generates computer graphics virtually showing that the machine tool operates for the predetermined time from the acquired data, acquires an image of the machine tool that has taken for the predetermined time, and compares the image with the computer graphics for the predetermined time.

The present disclosure is the category of a computer system, but the categories of a method, a program, etc. have similar functions and effects.

The present disclosure can provide a computer system, and a method and a program for operation verification that easily know the operation of a machine tool more exactly.

DETAILED DESCRIPTION

Embodiments of the present disclosure will be described below with reference to the attached drawings. However, this is illustrative only, and the technological scope of the present disclosure is not limited thereto.

Overview of System for Operation Verification 1

Figure 1:
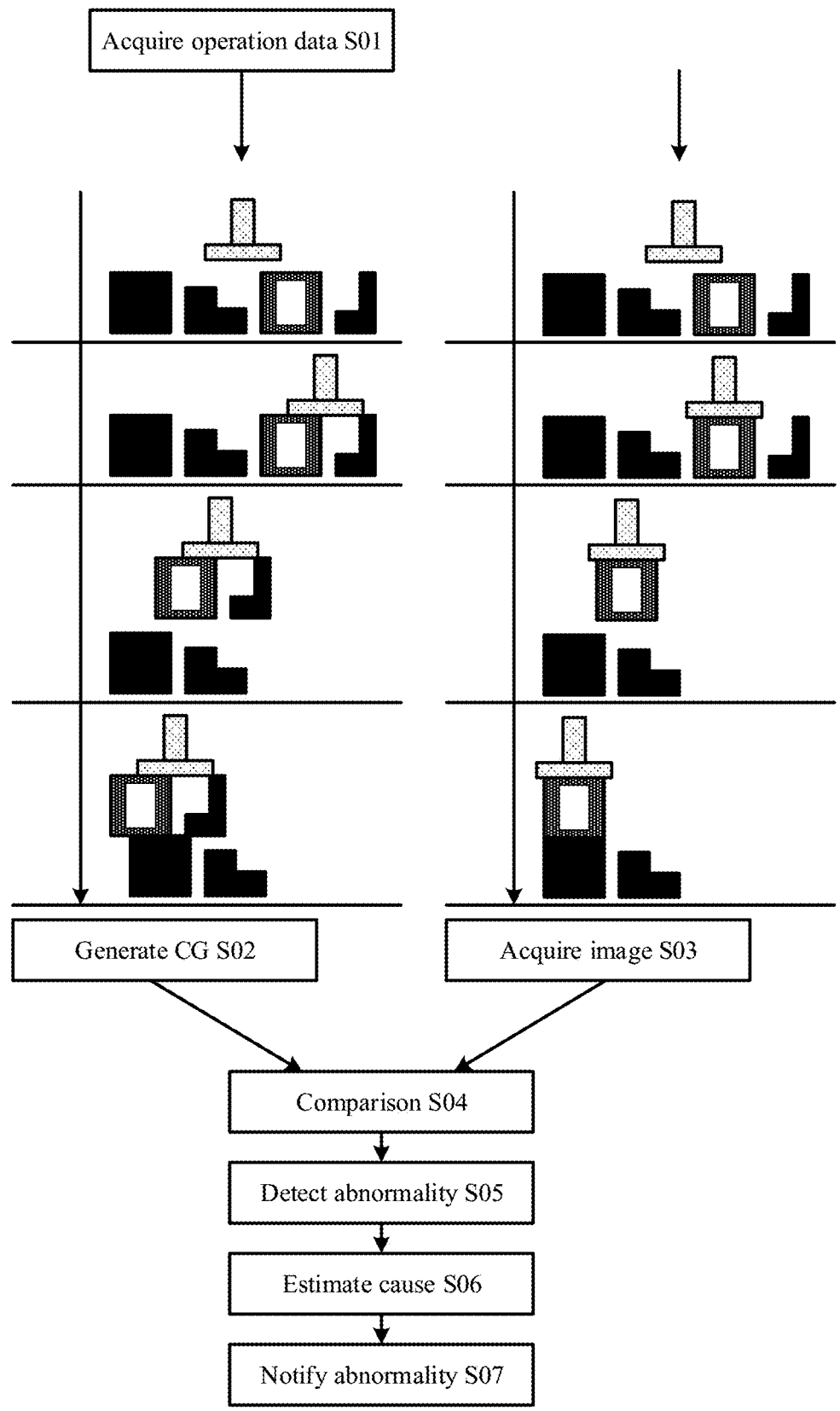
FIG. 1 is a schematic diagram of the system for operation verification 1.

A preferable embodiment of the present disclosure is described below with reference to FIG. 1. FIG. 1 shows an overview of the system for operation verification 1 according to a preferable embodiment of the present disclosure. The system for operation verification 1 is a computer system including a computer 10 to perform operation verification for a machine tool.

The system for operation verification 1 may include an imaging device that takes the image of a machine tool, various detection sensors that detect the operation and the orientation of a machine tool, and other devices such as manager terminals carried by managers who manage a machine tool, and other sensors.

The computer 10 is a computer device data-communicatively connected with the above-mentioned imaging device, various detection sensors, manager terminals, etc., that are not shown in the drawings through a public line network, etc.

The computer 10 acquires data on the operation of a machine tool from various detection sensors while the machine tool operates for a predetermined time. The predetermined time is a previously determined time or a time necessary for one or more processes. The computer 10 generates computer graphics (hereinafter referred to as "CG") virtually showing the operation of the machine tool for the predetermined time from the acquired data. The computer 10 also generates the CG image of not only the machine tool but also the image of a work object of the machine tool. The computer 10 also acquires the image of the machine tool for the predetermined time while the computer 10 is acquiring the data on the operation of the machine tool. This image is a moving or a still image. The computer 10 compares the acquired image with the generated CG for the predetermined time. The computer 10 judges if there is a difference between the acquired image and the generated CG by the comparison and detects an abnormality in the machine tool if the difference exists.

If the computer 10 detects an abnormality, the computer 10 estimates the component causing the abnormality of the machine tool. At this time, the computer 10 estimates the component related to the part that was operating at the first time when the difference was caused. For example, the part is an arm. The component related to the part is a position sensor installed on the arm.

The computer 10 notifies a manager terminal of the detection result. At this time, the computer 10 notifies a manager of the estimated cause and the time of the abnormality occurrence as the detection result.

The overview of the process that the system for operation verification 1 performs is described below.

The computer 10 acquires operation data indicating the operation of a machine tool while the machine tool operates for a predetermined time (Step S01). The computer 10 acquires data on the operation and the orientation of a machine tool as operation data from various detection sensors installed on this machine tool and other places where the orientation, the operation, etc. of this machine tool can be detected. The predetermined time is a previously set time or a time necessary for one or more processes or a previously set predetermined operation (e.g., travelling, holding, conveying, placing). The computer 10 knows the operation and the orientation of the machine tool by acquiring the operation data.

The computer 10 generates CG virtually showing that the machine tool operates for the predetermined time from the acquired operation data (Step S02). The computer 10 also generates the CG of a work object of the machine tool in addition to the machine tool. At this time, the computer 10 generates this CG based on the previously set default positions of the machine tool and the object and the previously set positional relationship. The CG generated by the computer 10 is continually updated for the acquired operation data.

The computer 10 acquires an image taken for the same time as the predetermined time while the computer 10 is generating CG (Step S03). The computer 10 acquires an image such as a moving or a still image of the machine tool and the object that the imaging device has taken.

The computer 10 analyzes the acquired image and the generated CG and compares the positional relationship of the machine tool and the object between the image and the CG (Step S04). At this time, the computer 10 judges if there is a difference in the positional relationship of the machine tool and the object between the CG and the image. For example, the computer 10 compares the positional relationship of the machine tool and the object between the CG and the image from the start to the end of the predetermined time.

The computer 10 detects that an abnormality is occurring in the machine tool if the computer 10 judges that the difference exists based on the comparison result (Step S05).

The computer 10 estimates the cause of the detected abnormality (Step S06). For example, the computer 10 extracts the first time when the difference was caused (i.e., when the difference between the CG and the image is first originated) from the comparison result, and estimates the component operating at this time or the part related to the component that is operating at this time as the cause of the abnormality.

The computer 10 notifies the estimated abnormality (Step S07). The computer 10 notifies a manager terminal, etc., of the cause of the fact that an abnormality has been detected or of the estimated abnormality. The computer 10 notifies a manager terminal that an abnormality is occurring in the machine tool or notifies it of the component estimated as the cause of the abnormality, for example.

The computer 10 may display the estimated abnormality in its display unit. In this case, the computer 10 need not necessarily notify a manager terminal.

System Configuration of System for Operation Verification 1

Figure 2:
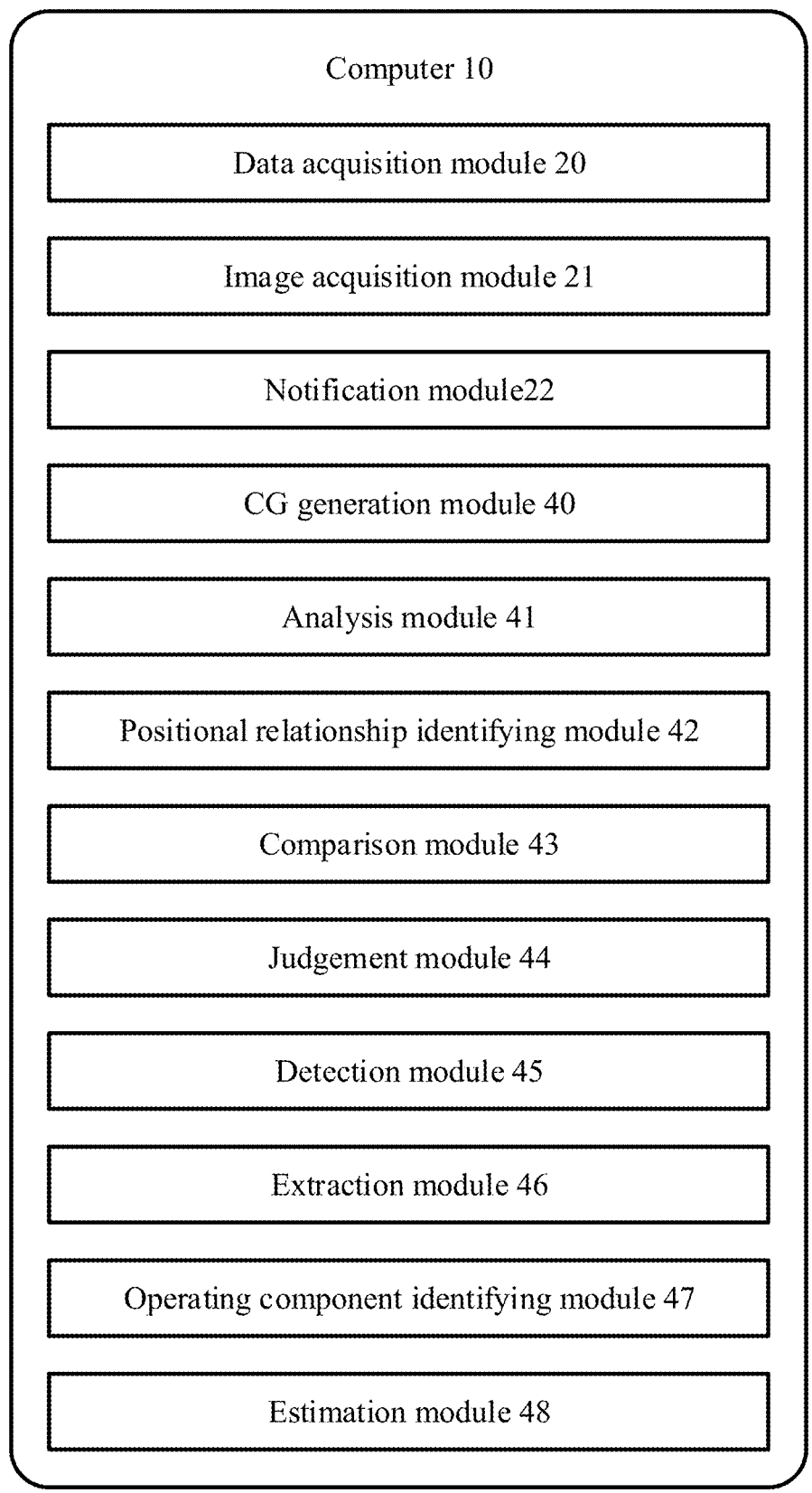
FIG. 2 is an overall configuration diagram of the system for operation verification 1.

A system configuration of the system for operation verification 1 according to a preferable embodiment will be described below with reference to FIG. 2. FIG. 2 is a block diagram illustrating the system for operation verification 1 according to a preferable embodiment of the present disclosure. In FIG. 2, the system for operation verification 1 is a computer system including a computer 10 to perform operation verification for a machine tool.

The system for operation verification 1 may include other devices and sensors such as imaging devices, various detection sensors, and manager terminals that are not shown in the figure. The system for operation verification 1 is data-communicatively connected with other devices and sensors through a public line network, etc.

The computer 10 includes a control unit provided with a central processing unit (hereinafter referred to as "CPU"), a random access memory (hereinafter referred to as "RAM"), and a read only memory (hereinafter referred to as "ROM"); and a communication unit such as a device that is capable to communicate with other devices and sensors such as imaging devices, various detection sensors, and manager terminals, for example, a Wireless Fidelity or Wi-Fi® enabled device complying with IEEE 802.11. The computer 10 also includes a memory unit such as a hard disk, a semiconductor memory, a record medium, or a memory card to store data. The computer 10 also includes a processing unit provided with various devices that perform various processes.

In the computer 10, the control unit reads a predetermined program to achieve a data acquisition module 20, an image acquisition module 21, and a notification module 22 in cooperation with the communication unit. Furthermore, in the computer 10, the control unit reads a predetermined program to achieve a CG generation module 40, an analysis module 41, a positional relationship identifying module 42, a comparison module 43, a judgement module 44, a detection module 45, an extraction module 46, and an operating component identifying module 47, an estimation module 48 in cooperation with the processing unit.

Operation Verification Process

Figure 3:
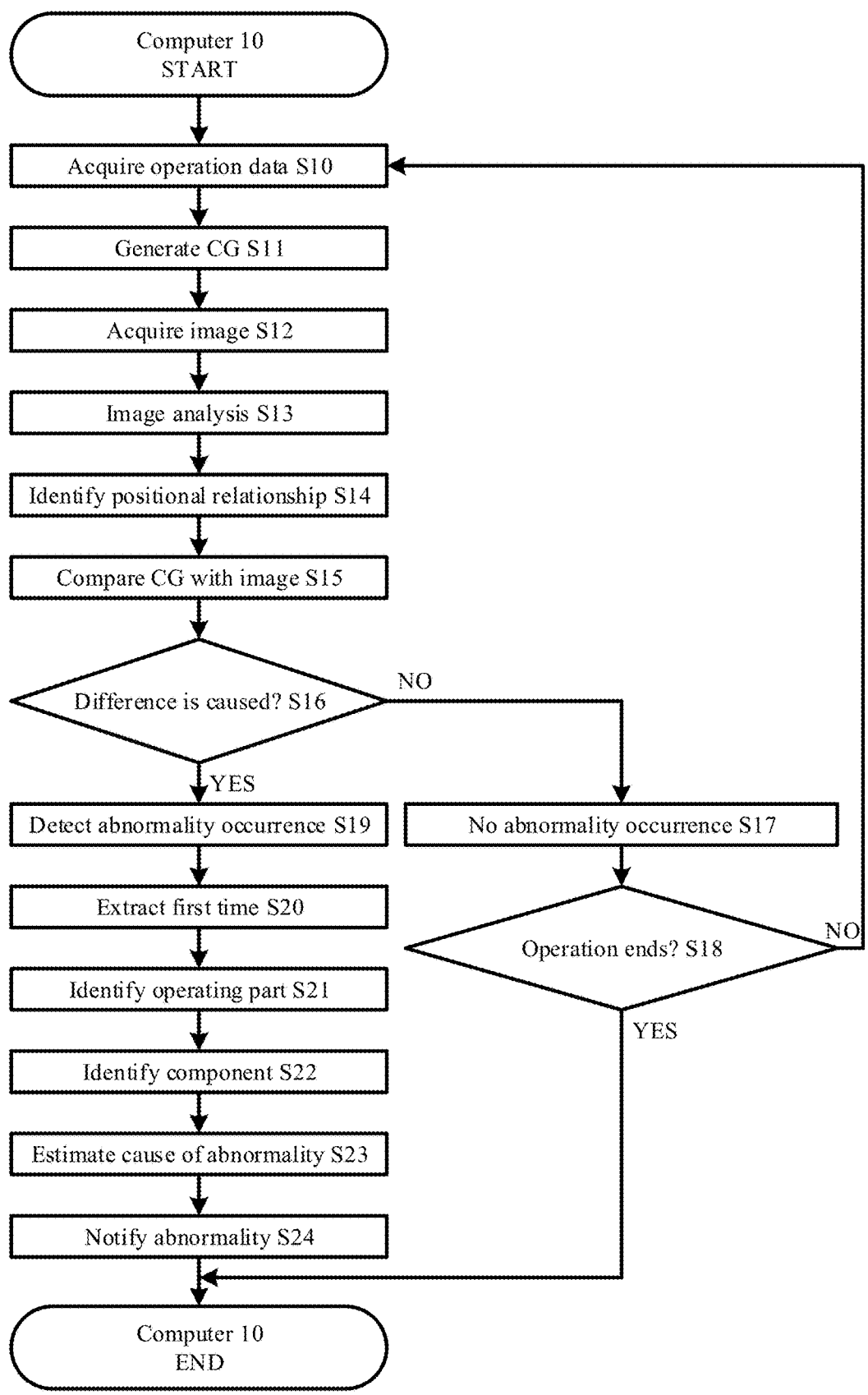
FIG. 3 is a flow chart illustrating the operation verification process performed by the computer 10.

The operation verification process performed by the system for operation verification 1 is described below with reference to FIG. 3. FIG. 3 is a flow chart illustrating the operation verification process performed by the computer 10. The tasks executed by the modules are described below with this process.

The data acquisition module 20 acquires data on the operation of the machine tool as operation data while the machine tool operates for a predetermined time (Step S10). In Step S10, the data acquisition module 20 acquires data on the orientation, the operation, etc., of the machine tool as operation data from a sensor installed on a predetermined position of the machine tool (e.g., a position senor installed on the arm). The predetermined time is a time necessary for one or more working processes performed by the machine tool or a previously set predetermined operation (e.g., travelling, holding, conveying, placing). The predetermined time can be optionally set by a manager, etc. This sensor detects the orientation and the operation of the entire or a part of the machine tool.

The CG generation module 40 generates CG virtually showing the machine tool based on the acquired operation data (Step S11). In Step S11, the CG generation module 40 generates CG showing the state in which the machine tool operates for the predetermined time. The CG is three-dimensional, which has a width, a depth, and a height. The CG generation module 40 also generates the CG of the operation object of the machine tool in addition to the machine tool. The CG of the object is generated based on the previously set default position. The CG generation module 40 generates a CG containing the machine tool based on the operation data and the object based on the previously set default position. The CG generation module 40 generates the CG as a moving image and a still image. The CG generated by the CG generation module 40 is stored for a predetermined time (e.g., from the start to the end of the operation of the machine tool or to the end of one or more working processes performed by the machine tool). The CG generation module 40 deletes the stored CG if the detection module 45 detects that no abnormality has occurred in the process as described later.

The CG generation module 40 continually updates the CG based on the acquired operation data. In this case, the CG generation module 40 changes and generates the CG of the machine tool and the operation object of the machine tool for the operation data.

For example, the machine tool is an arm equipped with a position sensor and a contact sensor. If the object is an assembly part, the CG generation module 40 generates a virtual arm based on the operation data and a virtual assembly part based on the default position of the assembly part. The CG generation module 40 generates one CG collecting these virtual things. The CG generation module 40 reproduces the movement of the arm in CG based on the operation data from the position sensor and the position and the state of the assembly part gripped or to be gripped by the arm in CG based on the operation data from the contact sensor. The CG generation module 40 continually generates the CG for the predetermined time.

The image acquisition module 21 acquires the image that an imaging device has taken for the same time as the predetermined time while the CG of the machine tool is being generated (Step S12). In Step S12, the imaging device takes the image such as a moving or a still image of the machine tool and the object. At this time, the imaging device takes the image according to the same time when the CG is generated. The image acquisition module 21 acquires the image taken by the imaging device. The CG that the CG generation module 40 has generated is synchronized with the image that the image acquisition module 21 has acquired. The image acquisition module 21 continually acquires the image for the predetermined time. The image acquisition module 21 acquires the image as a moving image and a still image. The image that the image acquisition module 21 has acquired is stored for a predetermined time (e.g., from the start to the end of the operation of the machine tool or to the end of one or more working processes performed by the machine tool). The image acquisition module 21 deletes the stored image if the detection module 45 detects that no abnormality has occurred in the process as described later.

The number of the imaging devices is one or two or more. If the number of the imaging devices is one, the imaging device takes an image from the place where this imaging device is located. If the number of the imaging devices is two or more, the imaging devices each take an image from the place where the imaging devices are each located.

The analysis module 41 analyzes the generated CG and the acquired image (Step S13). In Step S13, the analysis module 41 extracts the feature points and the feature amounts of the CG and the image. The analysis module 41 extracts, for example, the shape and the outline as the feature points. The analysis module 41 extracts statistical numerical values such as the average, the variance, and the histogram of pixel values as the feature amounts. The analysis module 41 continually acquires the image for the predetermined time.

The positional relationship identifying module 42 identifies the positional relationship between the machine tool and the object in the CG and the image based on the result of the image analysis (Step S14). In Step S14, the positional relationship identifying module 42 identifies the positional relationship of the machine tool and the object in the CG and the image based on the extracted feature points or feature amounts. For example, the positional relationship identifies which position of the object the machine tool grips, which position of the object the machine tool has contact with, which position of the object the machine tool is approaching, and which position of another object the machine tool has placed one object on. The positional relationship identifying module 42 continually identifies the machine tool and the object for the predetermined time.

The comparison module 43 compares the CG with the image at a predetermined time (Step S15). In Step S15, the comparison module 43 compares the positional relationship between the machine tool and the object in the CG with that in the image. The comparison module 43 compares the CG with the image for the predetermined time from the start to the end of the operation of the machine tool. The start of the operation is when the machine tool starts to operate. The end of the operation is when the machine tool ends the previously set operation or when some or all of the working processes previously set in the machine tool end. The comparison module 43 compares the CG with the image based on the two types of images, a still image and a moving image. Specifically, the comparison module 43 compares the CG generated as a still image with the image acquired as a still image and also compares the CG generated as a moving image with the image acquired as a moving image. The computer 10 uses the result of comparison of the two types of images for the process described later.

The judgement module 44 judges if there is a difference in the positional relationship between the machine tool and the object in the CG and the image as the comparison result (Step S16). In Step S16, for example, the difference in the positional relationship indicates the difference in the position of the object the machine tool grips, the position of the object the machine tool has contact with, the position of the object the machine tool is approaching, and the position of another object the machine tool has placed one object on. If the judgement module 44 judges that there is no difference (Step 16, NO), the detection module 45 detects that no abnormality has occurred (Step S17).

The judgement module 44 judges if the machine tool ends the operation (Step S18). In Step S18, the judgement module 44 judges that the operation has ended in the CG and the image based on whether or not a previously set predetermined time has passed, whether or not the previously set operation has ended, or whether or not some or all of the previously set working processes have ended. If the judgement module 44 judges that the machine tool has ended the operation (Step S18, Yes), the detection module 45 detects that no abnormality has occurred and ends this process.

On the other hand, if the judgement module 44 judges that the machine tool has not ended the operation (Step S18, NO), the data acquisition module 20 performs the above-mentioned step S10 again.

In Step S16, the judgement module 44 judges that there is a difference (Step S16, YES), the detection module 45 detects that an abnormality is occurring (Step S19). In Step S19, for example, the detection module 45 detects the difference in the position of the object the machine tool grips, the position of the object the machine tool has contact with, the position of the object the machine tool is approaching, or the position which position of another object the machine tool has placed one object on, as an abnormality.

The extraction module 46 extracts the first time when an abnormality was detected (Step S20). In Step S20, the extraction module 46 extracts the first time when an abnormality may have occurred for the time from when the comparison module 43 started the comparison to when the detection module 45 detected the abnormality. This is because the timing when the detection module 45 detected an abnormality is only to detect an abnormality as the result but the actual abnormality occurred earlier. For example, the extraction module 46 extracts the time when the position of the machine tool shifts before this machine tool grips the object as the first time if an abnormality has been detected at the position of the object that the machine tool grips. For example, the extraction module 46 extracts the time when the position of the machine tool shifts before this machine tool has contact with the object as the first time if an abnormality has been detected at the position of the object that machine tool has contact with. For example, the extraction module 46 extracts the time when the position of the machine tool shifts before this machine tool is approaching the object as the first time if an abnormality has been detected at the position of the object that the machine tool is approaching. For example, the extraction module 46 extracts the time when the position of the machine tool shifts before this machine tool places one object on another object as the first time if an abnormality has been detected at the position which position of another object the machine tool has placed one object on.

The operating component identifying module 47 identifies the part operating at the extracted first time (Step S21). In Step S21, the operating component identifying module 47 identifies the part (e.g., arm, click) of the machine tool operating at the extracted first time. The operating component identifying module 47 identifies the part operating at this time in any one or both of the CG and the image. The operating component identifying module 47 identifies the part of the machine tool that was operating or operated at this time as the part operating at the extracted first time.

The operating component identifying module 47 identifies the component installed on the identified part (Step S22). In Step S22, the operating component identifying module 47 identifies the component installed on the identified part by looking up a table, etc., previously associating and storing each of the parts of the machine tool with an installed component. Examples of the component include a position sensor, a pressure sensor, and an orientation sensor. In the above-mentioned table associating the arm with a position sensor, if the identified part is the arm, the operating component identifying module 47 identifies the position sensor associated with the arm as the component installed on the identified part.

The estimation module 48 estimates the identified component as the cause of the abnormality (Step S23). In Step S23, the estimation module 48 estimates that the component causes the difference between the CG and the image and estimates this component as the cause of the abnormality.

The estimation module 48 may estimate a component causing the abnormality if an abnormality has been detected in the above-mentioned process. For example, the estimation module 48 may estimate the component installed on the part operating at the timing when an abnormality was detected, regardless of the part operating at the extracted first time. Specifically, after the operating component identifying module 47 identifies the component associated with this part by looking up the above-mentioned table, etc., the estimation module 48 may estimate this identified component as the cause of the abnormality.

The notification module 22 notifies a manager terminal of the estimated component as the cause of the abnormality (Step S24). In Step S24, the notification module 22 notifies a manager terminal that the machine tool is not operating as expected due to the abnormality of the component installed in this machine tool. The manager terminal notifies the manager of the abnormality by displaying this notification on its display unit. Accordingly, the notification module 22 notifies a manager of an abnormality by displaying the notification on the manager terminal. At this time, the notification module 22 also notifies the time when the abnormality occurred.

The notification module 22 is not limited to the estimated component and may notify a manager terminal that an abnormality has occurred. The notification module 22 may also notify of not only the estimated component but also the abnormality of the machine tool.

Moreover, the notification module 22 may display the estimated component and also display an abnormality is occurring on its display unit. In this case, the computer 10 needs not necessarily notify a manager terminal.

Figure 4:
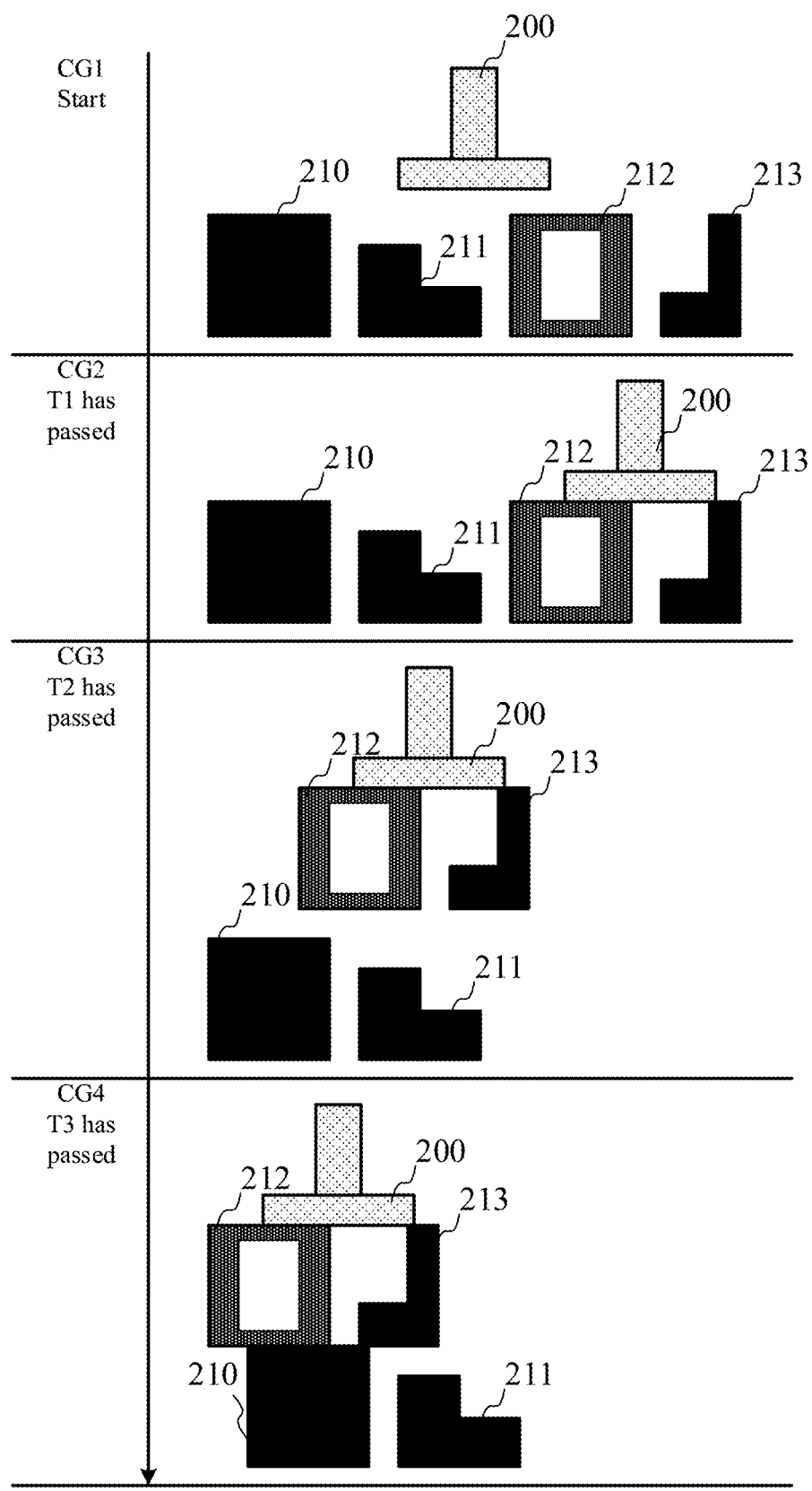
FIG. 4 schematically shows computer graphics that the computer 10 has generated according to time series variation.
Figure 5:
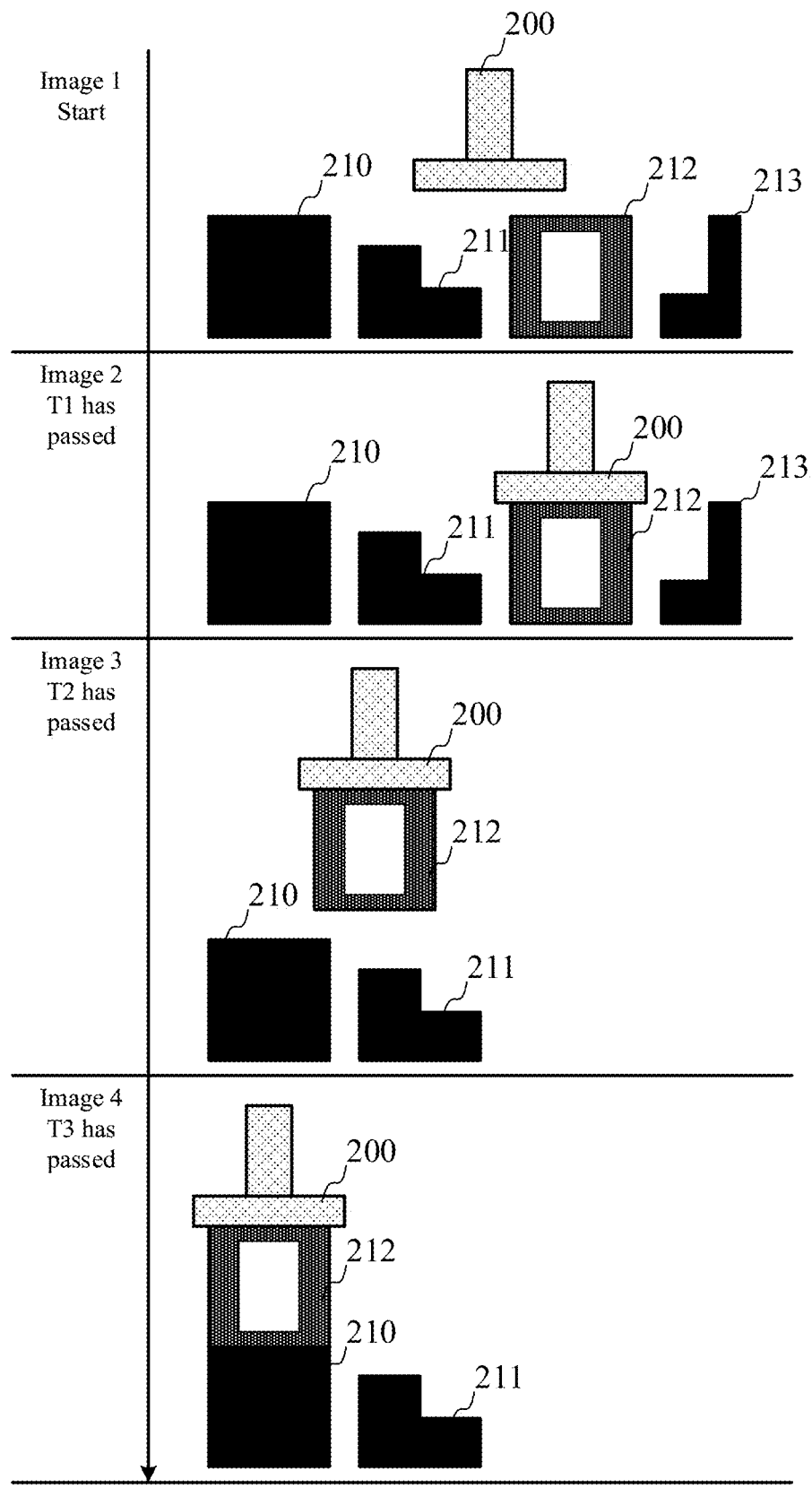
FIG. 5 schematically shows images that the computer 10 has acquired according to time series variation.

The above-mentioned operation verification process is described with reference to FIGS. 4 and 5. FIG. 4 schematically shows the CG that the CG generation module 40 has generated according to time series variation. FIG. 5 schematically shows images that the image acquisition module 21 has acquired according to time series variation.

In FIG. 4, the CG generation module 40 reproduces the arm 200 as a machine tool and the assembly parts 210-213 as the objects in the step S11 in CG based on the acquired operation data acquired in the step S10. CG1 is a CG of when the arm 200 starts to operate. CG2 is a CG of when the time T1 has passed since the arm 200 started to operate. CG3 is a CG of when the time T2 has passed since CG2 was reproduced. CG4 is a CG of when the time T3 has passed since CG3 was reproduced.

In FIG. 5, the image acquisition module 21 shows the image acquired in the step S12. The image 1 is an image of when the arm 200 starts to operate. The image 2 is an image of when the time T1 has passed since the arm 200 started to operate. The image 3 is an image of when the time T2 has passed since the image 2 was acquired. The image 4 is an image of when the time T3 has passed since the image 3 was acquired.

In FIGS. 4 and 5, the times T1, T2, and T3 for the CGs and the images are the same.

The analysis module 41 performs image analysis for the CG and the image in the step S13. The positional relationship identifying module 42 identifies the positional relationship between the arm 200 and the objects 210-213 in the CG and the image based on the result of the image analysis of the CG and the image in the step S14

The comparison module 43 compares the CGs with the images at the time from when the arm 200 starts to operate to when the time T3 has passed in the step S15. At this time, the comparison module 43 compares the image 1 with the CG1 (of when the arm 200 starts to operate), the image 2 with the CG2 (of when the time T1 has passed since the arm 200 started to operate), the image 3 with the CG3 (of when the time T2 has passed since T1), and the image 4 with the CG4 (of when the time T3 has passed since T2). The comparison module 43 compares the positional relationships between the arm 200 and the objects 210-213 in the images and the CGs.

The judgement module 44 judges if there is a difference between the CGs and the images in the step S16. The judgement module 44 judges that there is a difference between the image 4 and the CG4. If there is no difference between the images and the CGs, the judgement module 44 and the detection module 45 perform the steps S17-S18.

The judgement module 44 judges that the CG2 shows that the arm 200 is gripping the objects 212 and 213 while the image 2 shows that the arm 200 is gripping only the object 212 at the time T1. The judgement module 44 judges that the CG3 shows that the arm 200 is gripping the objects 212 and 213 while the image 3 shows that the arm 200 is gripping only the object 212 at the time T2. The judgement module 44 judges that the CG4 shows that the arm 200 is gripping the objects 212 and 213 to place them on the object 210 while the image 4 shows that the arm 200 is gripping the object 212 to place it on the object 210 at the time T3.

Since there are differences between the CGs and the images, the detection module 45 detects that an abnormality is occurring from the time T1 to the time T3 when these differences are caused, in the step S19.

The extraction module 46 extracts the first time when an abnormality was detected in the step S20. The extraction module 46 extracts the time T1 when the difference was first generated as the first time when an abnormality was detected.

The operating component identifying module 47 identifies the arm 200 as the part operating at the time T1 in the step S21.

The operating component identifying module 47 identifies the position sensor previously associated with the arm 200 as the component installed on the arm 200 in the step S22.

The estimation module 48 estimates the identified position sensor as the cause of the abnormality in the step S23.

The notification module 22 notifies that the position sensor has an abnormality, resulting in that the arm 200 is not working as expected, in the step S24.

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present disclosure are described above. However, the present disclosure is not limited to the above-mentioned embodiments. The effect described in the embodiments of the present disclosure is only the most preferable effect produced from the present disclosure. The effects of the present disclosure are not limited to those described in the embodiments of the present disclosure.

DESCRIPTION OF REFERENCE NUMBERS

1 System for operation verification
10 Computer

What is claimed is:

1. A computer system, comprising:
    a data acquisition unit configured to acquire operating data while a machine tool operates for a predetermined time;
    a CG generation unit configured to generate computer graphics virtually showing that the machine tool operates for the predetermined time from the acquired data;
    a camera image acquisition unit configured to acquire an image of the machine tool that has taken for the predetermined time; and
    a comparison unit configured to compare the image with the computer graphics for the predetermined time.

2. The computer system according to claim 1, further comprising:
    a detection unit configured to detect an abnormality of the machine tool if the machine tool is operating differently as the result of the comparison; and
    a notification unit configured to notify the detected abnormality.

3. The computer system according to claim 2, further comprising:
    an estimation unit configured to estimate a component causing the abnormality of the machine tool if the abnormality has been detected, wherein
    the notification unit is configured to notify the estimated component.

4. The computer system according to claim 3, further comprising:
    an extraction unit configured to extract the first time that the machine tool is operating differently if the abnormality has been detected, wherein
    the estimation unit configured to estimate a component related to the part operating at the first extracted time as the cause of the abnormality.

5. A method for operation verification that a computer system executes, comprising the steps of:
    acquiring operating data while a machine tool operates for a predetermined time;
    generating computer graphics virtually showing that the machine tool operates for the predetermined time from the acquired data;
    acquiring an image of the machine tool that has taken for the predetermined time; and
    comparing the image with the computer graphics for the predetermined time.

6. A computer readable program stored on a non-transitory computer-readable medium for causing a computer system to execute the steps of:
    acquiring operating data while a machine tool operates for a predetermined time;
    generating computer graphics virtually showing that the machine tool operates for the predetermined time from the acquired data;

acquiring an image of the machine tool that has taken for the predetermined time; and comparing the image with the computer graphics for the predetermined time.

* * * * *